Jan. 5, 1926.  
C. F. SCHMELZ  
1,568,473  
MACHINE FOR CUTTING OFF PIPE  
Filed Dec. 30, 1924  
3 Sheets-Sheet 1
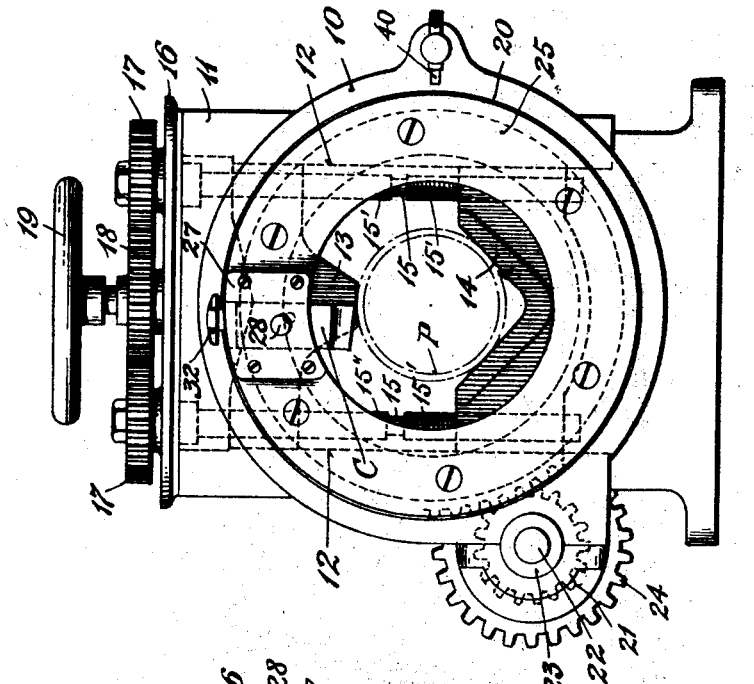
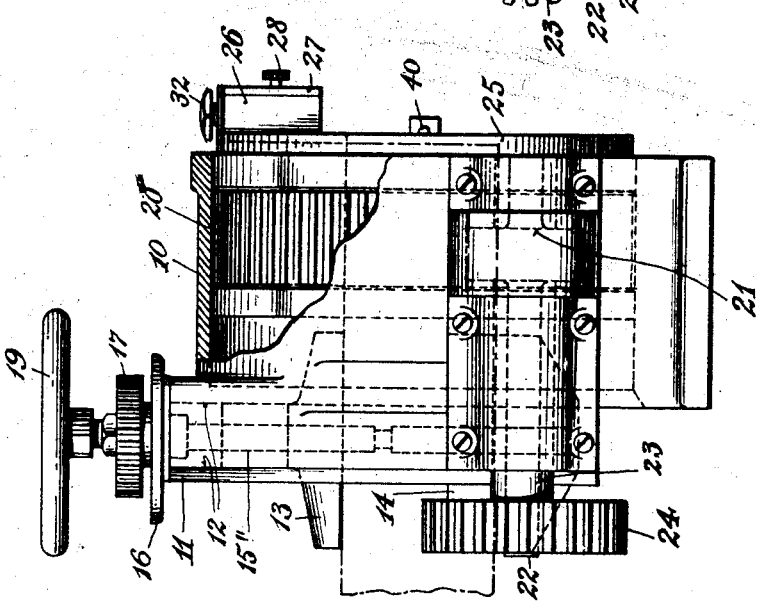
INVENTOR.  
C. F. Schmelz  
BY  
ATTORNEY.

Jan. 5, 1926.   1,568,473
C. F. SCHMELZ
MACHINE FOR CUTTING OFF PIPE
Filed Dec. 30, 1924   3 Sheets-Sheet 2
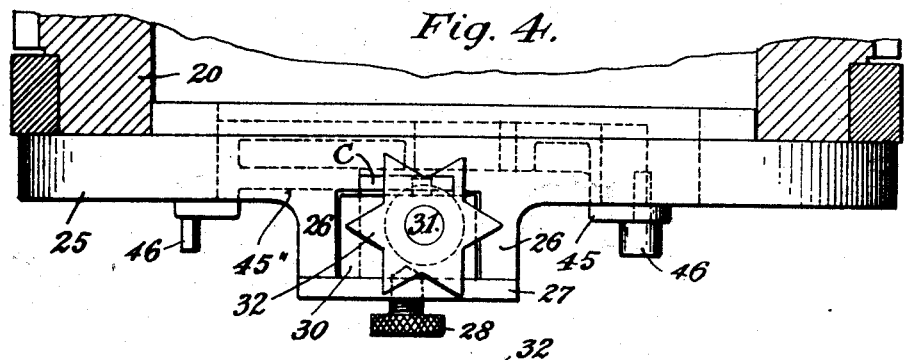
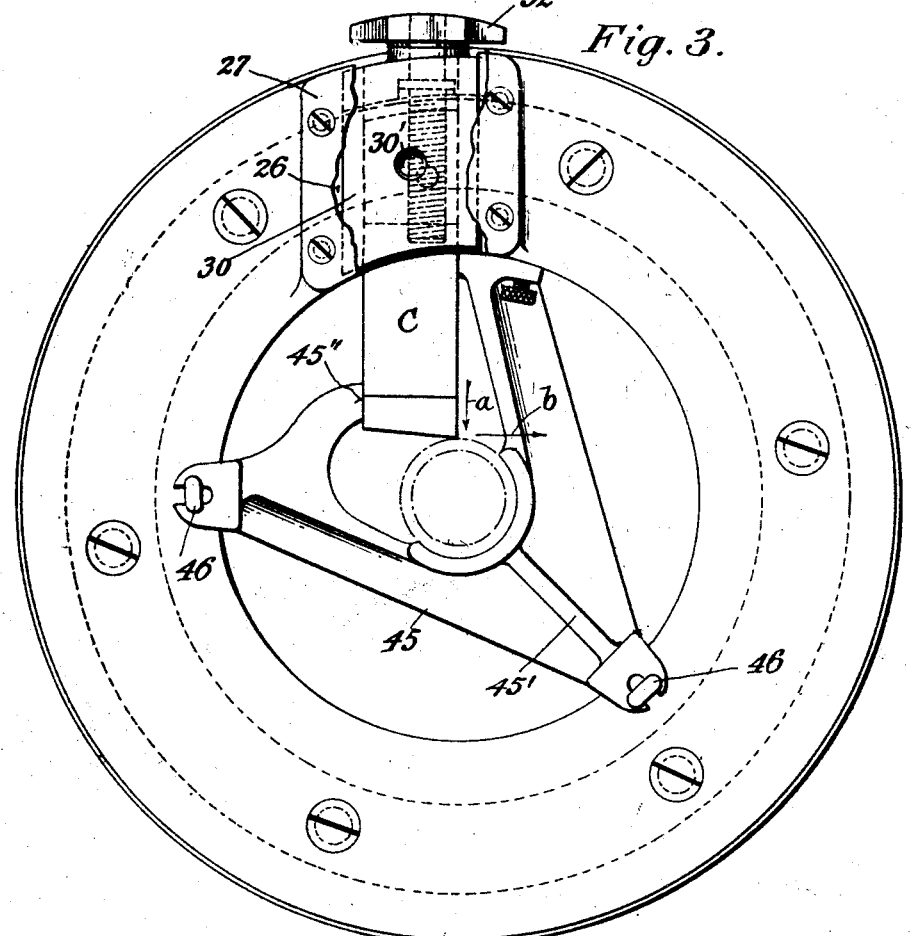
INVENTOR.
C. F. Schmelz
BY
ATTORNEY Jan. 5, 1926.  1,568,473
C. F. SCHMELZ
MACHINE FOR CUTTING OFF PIPE
Filed Dec. 30, 1924  3 Sheets-Sheet 3

INVENTOR.
C. F. Schmelz
BY
ATTORNEY.

Patented Jan. 5, 1926.

1,568,473

UNITED STATES PATENT OFFICE.

CHARLES F. SCHMELZ, OF BRIDGEPORT, CONNECTICUT, ASSIGNOR TO THE CURTIS & CURTIS CO., OF BRIDGEPORT, CONNECTICUT, A CORPORATION OF CONNECTICUT.

MACHINE FOR CUTTING OFF PIPE.

Application filed December 30, 1924. Serial No. 758,809.

*To all whom it may concern:*

Be it known that I, CHARLES F. SCHMELZ, a citizen of the United States, residing at the city of Bridgeport, in the county of Fairfield and State of Connecticut, have invented certain new and useful Improvements in Machines for Cutting Off Pipe; and I do declare the following to be a full, clear, and exact description of the invention, such as will enable others skilled in the art to which it appertains to make and use the same.

This invention relates to pipe cutting off machines, and more especially to that class thereof in which the article to be cut off is firmly held in a vise, while the cut-off tool is revolved around the same and gradually fed in toward the center during the consecutive revolutions.

The present invention has for one of its objects the provision of a machine in which the cut-off tool is carried and moved by an improved mechanism which permits a ready removal of the cut-off tool proper, and also the replacement thereof by another.

The invention has, furthermore, for its object, the provision of means whereby the piece to be cut off, especially in the smaller sizes thereof, will be centrally supported in position relative to the axis of revolution of the cut-off tool, such supporting means also incorporating a backing-member for supporting or backing the cut-off tool proper during the cutting off operation.

Further objects of the invention will hereinafter appear and be particularly pointed out in the claims.

The invention has been clearly illustrated in the accompanying drawings in which similar characters denote similar parts, and in which—

Figure 1 is a front view of a cutting-off machine embodying my invention—

Figure 2 is a side view thereof partly broken away to disclose the interior—

Figure 3 is a front view of the face plate which is secured to the power driven member of the machine and which carries the cut-off tool with its operating mechanism—

Figure 4 is a top view thereof—

Figure 5:
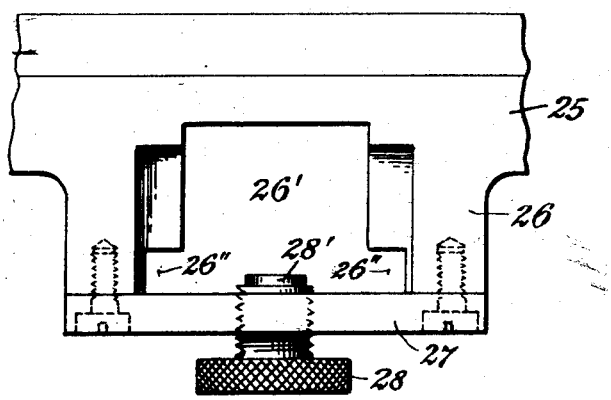
Figure 5 is an enlarged top view of a fraction of the face plate shown in Figure 4, the cut-off tool and its holder, however, having been removed—

Referring to the drawings, the numeral 10 denotes a shell or casing which is provided at its rear end with a projection 11 having ways 12 for slidably supporting a pair of jaws 13, 14, adapted to be moved toward or away from each other by a pair of screws 15 having right hand threads 15' and left hand threads 15", the upper ends of said screws being journaled in the top plate 16 and carrying at their outer ends similar gears 17 which are in engagement with a central gear 18 to which rotary motion may be imparted by a hand wheel 19.

The mechanism thus far described constitutes a device whereby cylindrical pieces of work, such as, for instance, a pipe P, will be gripped and held centrally relatively to the axial bore of the shell 10.

Mounted for rotation in the shell 10, is a ring gear 20 in engagement with a pinion 21 which is mounted on, or constitutes a part of, the shaft 22, the latter being journaled in bearings 23 of the shell or casing 10. At its rear end the shaft 22 has a gear 24 to which rotary motion may be imparted from any convenient source.

Secured to the front face of the ring gear 20 is a face plate 25 provided with a lug 26 in which the cut-off tool and its actuating mechanism is supported.

Figure 6:
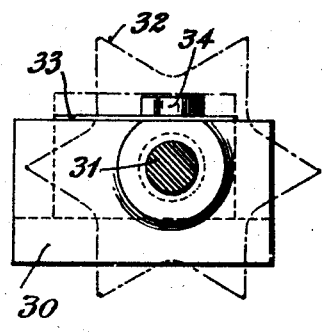
Figure 6 is a top view of the cut-off tool holder as it appears in its removed condition—
Figure 9:
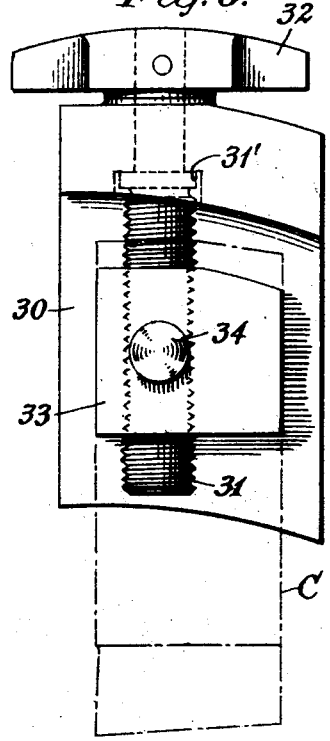
Figure 9 is a rear view of the same.

By referring to Figure 5 it will be noted that the lug 26 is cut out leaving an opening 26' for the reception of the cut-off tool holder illustrated in Figure 6, a front plate 27 connecting the two side portions of the lug 26 and also carrying a clamp screw 28 for holding the tool holder in its position within the lug 26.

Figure 8:
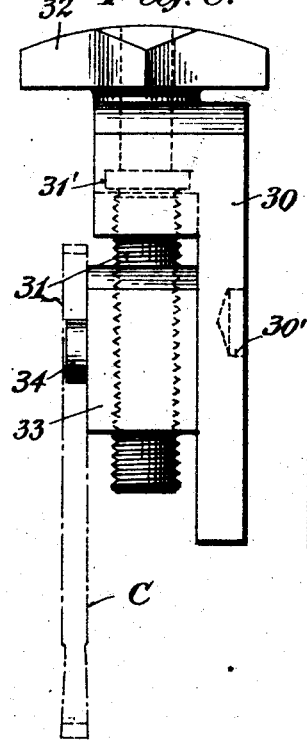
Figure 8 is a side view thereof.
Figure 7:
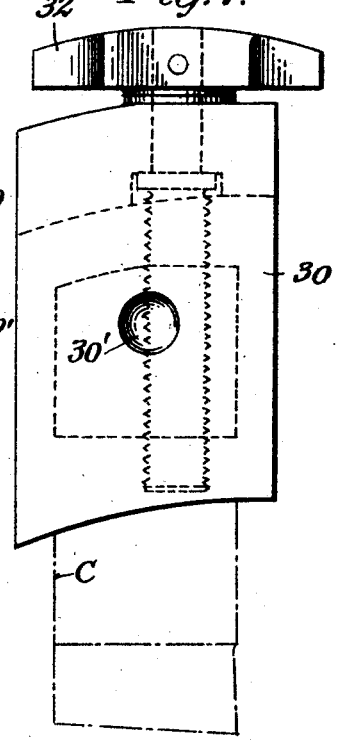
Figure 7 is a front view of the same—

The tool holder consists primarily of an L-shaped member 30 the front apron of which is fitted to be placed in the notches 26" (see Figure 5), and it is normally firmly held in its position by the clamp screw 28, the inner end of which has a nib 28' adapted to enter a recess 30' (see Figures 7 and 8) of the front plate 30.

The upper portion of the L-shaped holder 30 carries a screw 31 the shank of which is journaled in the plate but is kept against longitudinal movement by a collar or shoulder 31' and a star wheel 32 at its outer end, as will be readily understood.

The screw 31 operates a nut 33 which is adapted to slide on the inner face of the member 30 and which has a pin 34 fitting an aperture in any one of a plurality of cut-off tools C to be used in the machine, the width of the nut being substantially equal to the width of the cut-off tool and also to the width of the main recess 26' above referred to so that both, nut and tool, are guided for movement within said recess, while the holder 30 remains stationary by virtue of the clamp screw 28 being in engagement therewith.

Attention is called to the fact that the nut-pin 34 is placed nearer to one edge of the nut 33 than to the other, so that, therefore, the cut-off tool must be properly assembled with the nut in order that it may be inserted, with the holder, into the lug 26 of the face plate. This circumstance is rather essential in order to bring the cutting edge of the tool into proper relation with the work to be cut.

A step-by-step feeding in movement is imparted to the cut-off tool by the intermittent rotation of the star wheel 32 above mentioned, such movement being effected by an actuating pin 40 (see Figures 1 and 2) which may be slipped inward and into the path of the star wheel or may be withdrawn therefrom to leave the latter inoperative.

The machine shown and described is adapted for handling pipes of different diameters, and, inasmuch as the feeding-in movement of the cut-off tool is limited, cut-off tools of different lengths are employed for different sizes of pipe. For instance, in the present machine, which is adapted for pipes the diameters of which range from six inches maximum to one inch minimum, cut-off tools of different lengths are employed, the tool having the greatest length reaching toward the center far enough to handle standard pipes ranging from one inch to two and one-half inches. The next length of cut-off tool will handle pipe from three inches to four and one-half inches and the shortest length of cut-off tool will handle pipe of five inches and six inches in diameter.

Inasmuch as it may be necessary to use the machine for different sizes of pipe so that it may be necessary to change the cut-off tool of one size to that of another, at a moment's notice, the benefit of the construction above described will be apparent.

By inspection of Figure 3 it will be noticed that the cut-off tool projects into the interior for a rather abnormal distance in order to operate on the smaller pipe shown, while, on the other hand, the guiding support of the tool in the face plate is comparatively short. Furthermore, practice has demonstrated that in the smaller sizes of pipe, say from one inch to two inches, the action of the cut-off tool on the pipe has a tendency of crowding or deflecting the pipe in two directions, in the direction of arrow $a$ by virtue of the inward pressure of the tool against the outer periphery of the pipe, and in the direction of arrow $b$ by virtue of the bite of the tool on the pipe during its revolution around the pipe. In practice it has been demonstrated that the forces acting against the pipe in the directions of arrows $a$ and $b$ are nearly alike, and for that reason I provide a resistance-member or "spider" 45 having its chief resisting portion 45' in a direction, relative to the feeding-in movement of the cut-off tool, in conformity with the "resultant" of a parallelogram of forces based upon the arrows $a$ and $b$. This spider is adapted to be placed into the opening of the face plate and may be held in place thereon by buttons 46, as will be readily understood. In order to support the inner end of the cut-off tool, and to remove, as far as practicable, the excessive strain upon the outer and guided portion of the same, the spider 45 has a backing portion 45'' so disposed that the cut-off tool may slide thereon during its movement toward or away from the center and will thus be held against deflection.

It will be understood that while for the smaller sizes of pipe a supporting member or spider for the pipe as well as for the cut-off tool supported in its holder, as above described, is absolutely essential, yet such support is not necessary for either the pipe or the cut-off tool when the larger sizes of pipe are being operated upon, the latter being stiff enough to stand any strain which may be put upon it by the cut-off tool either through the feeding-in movement or from the action of the tool cutting its way into the pipe. In that case the inward projection of the cut off tool would be comparatively short and the tool would be sufficiently supported at its outer end within the lug 26 of the face plate.

On the other hand, spiders may be employed to take care of the larger sizes of pipe and corresponding cut-off tools, as well.

I claim:

1. In a machine for cutting off pipe, the combination of the rotary face plate having projecting therefrom an integral lug cut out to form an opening, means for automatically and continuously rotating said plate, an L-shaped tool holder detachably secured within said opening, a rotary feed screw carried by said holder and secured as against lengthwise movement, a nut on said screw stationary as to independent rotation, a cut off tool detachably carried by said nut, and means for automatically actuating said screw intermittently during successive rotations of said face plate.

2. In a machine for cutting off pipe, the combination of the rotatable face plate, means for holding the pipe, a lug carried by said plate and cut away to form an opening, the L-shaped tool holder detachably secured within said opening, a feed screw stationary as to lengthwise movement and carried by said holder, a nut on said screw held as against independent rotation, a cutting tool removably carried by said nut, means for actuating said screw intermittently during successive rotations of said face plate, and a spider detachably secured to said plate and having a shouldered part along which said tool has a sliding contact and which resists the thrust of the tool during the operation of cutting off the pipe.

3. In a machine for cutting off pipe, the combination with the rotatable face plate and the cutting tool carried by said plate, of a spider having a shouldered part along which said tool has a sliding contact and which resists the thrust of the tool during the operation of cutting off the pipe, and means for detachably securing said spider to said face plate.

In testimony whereof I affix my signature hereto.

CHARLES F. SCHMELZ.